(12) United States Patent
Nguyen et al.

(10) Patent No.: US 6,191,904 B1
(45) Date of Patent: Feb. 20, 2001

(54) DATA SECTOR TIMING COMPENSATION TECHNIQUE BASED UPON DRIVE ECCENTRICITY

(75) Inventors: Vien N. Nguyen, San Jose; David Drouin, Milpitas, both of CA (US)

(73) Assignee: Castlewood Systems, Inc., Milpitas, CA (US)

( * ) Notice: Under 35 U.S.C. 154(b), the term of this patent shall be extended for 0 days.

(21) Appl. No.: 08/970,866

(22) Filed: Nov. 14, 1997

(51) Int. Cl.$^7$ .................................................. G11B 5/09
(52) U.S. Cl. ................... 360/51; 360/73.03; 360/77.04; 360/77.08
(58) Field of Search .................................. 360/51, 73.03, 360/77.04, 77.08, 77.07; 711/167

(56) References Cited

U.S. PATENT DOCUMENTS

| | | | |
|---|---|---|---|
| 5,235,478 | 8/1993 | Hoshimi et al. | 360/77.08 |
| 5,257,149 | 10/1993 | Meyer | 360/78.14 |
| 5,398,141 | 3/1995 | Tannert | 360/133 |
| 5,465,338 | * 11/1995 | Clay | 710/130 |
| 5,523,903 | 6/1996 | Hetzler et al. | 360/77.08 |
| 5,535,072 | 7/1996 | Witt et al. | 360/99.06 |
| 5,559,648 | 9/1996 | Hunter et al. | 360/75 |
| 5,570,244 | 10/1996 | Wiselogel | 360/60 |
| 5,579,189 | 11/1996 | Morehouse et al. | 360/105 |
| 5,587,850 | 12/1996 | Ton-that | 360/77.08 |
| 5,615,063 | 3/1997 | Kuroki et al. | 360/66 |
| 5,636,075 | 6/1997 | Nishimura et al. | 360/48 |
| 5,680,267 | * 10/1997 | Tanaka et al. | 360/51 |
| 5,761,165 | * 6/1998 | Takeda et al. | 369/47 |

* cited by examiner

*Primary Examiner*—Hoa T. Nguyen
*Assistant Examiner*—Dan I. Davidson
(74) *Attorney, Agent, or Firm*—Townsend and Townsend and Crew LLP

(57) ABSTRACT

A technique for reading data from a magnetic disk includes the steps of providing the magnetic disk including a cylinder having a plurality servo sectors, a plurality of data sectors, and a zone data table, the plurality of servo sectors including a first servo sector, a second servo sector, a third servo sector, a fourth servo sector, and a fifth servo sector, the zone data table including at least a nominal timing latency between the fourth servo sector and a data sector from the plurality of servo sectors, reading the first servo sector, the second servo sector, the third servo sector, and the fourth servo sector from the magnetic disk, determining a first timing deviation for the first servo sector between the first servo sector and the second servo sector, determining a second timing deviation for the second servo sector between the second servo sector and the third servo sector, predicting a predicted third timing deviation for the fourth servo sector between the fourth servo sector and the fifth servo sector, in response to the first timing deviation and to the second timing deviation, modifying the nominal timing latency in response to the predicted third timing deviation to form a predicted timing latency, and waiting the predicted timing latency after reading the fourth servo sector before reading the data sector.

19 Claims, 10 Drawing Sheets

DATA SECTOR TIMING COMPENSATION TECHNIQUE BASED UPON DRIVE ECCENTRICITY

BACKGROUND OF THE INVENTION

The present invention generally relates to removable storage devices for electronic information. More particular, the present invention relates to compensating for data sector timing variations due to drive eccentricity.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

Reading and writing to magnetic disks within removable cartridges provide unique challenges not fully appreciated or addressed by fixed disk drive units. For example, the magnetic disks within removable cartridges are typically subject to greater temperature, humidity, particulate contamination, shock, mechanical stresses, etc. than magnetic disks that are sealed and protected inside fixed disk drive environments. Further, removable cartridges are repeatedly inserted and ejected from removable drive units, whereas fixed disk drives are not. As a result, removable drive units receiving such removable cartridges must be able to adapt to the greatly varying conditions of the magnetic disks.

FIG. 7 illustrates one particular difficult problem not faced by fixed disk drive units is that the variation in eccentricity between different magnetic disks. FIG. 7 includes a magnetic disk 900 having a cylinder 910. The geometric axis of rotation 920 of magnetic disk 900 is shown, as well as an eccentric axis of rotation 930.

Drive eccentricity typically refers to the variation in the axis of rotation for a magnetic disks. Typically magnetic disks are rotated around geometric axis of rotation 920 and preformatted in the factory with well known servo bursts at regularly spaced intervals, for example along cylinder 910.

FIG. 8 illustrates an ideal timing diagram of signals from a magnetic disk. FIG. 8 includes a servo burst signal 1000 and a data sector signal 1010. Servo burst signal 1000 includes servo bursts 1020–1050, and data sector signal 1010 includes data sectors 1060–1110. As illustrated, the nominal latency x between servo burst 1020 and data sector 1060 is the same as between servo burst 1040 and data sector 1090, and the nominal latency y between servo burst 1030 and data sector 1080 is the same as between servo burst 1050 and data sector 1110. Further the nominal timing t between servo bursts 1020, 1030, 1040, etc. respectively is the same.

In this example, data sectors 1070 and 1100 are split between two servo sectors, thus preferably servo burst 1020 is used for accessing data sectors 1060 and 1070, servo burst 1030 is used for accessing data sector 1080, servo burst 1040 is used to access data sectors 1090 and 1100, and servo burst 1050 is used to access data sector 1100.

FIG. 9 illustrates a typical timing diagram of signals from an eccentric magnetic disk. FIG. 9 includes a servo burst signal 1000' and a data sector signal 1010'. Servo/burst signal 1000' includes servo bursts 1020'–1050', and data sector signal 1010' include data sectors 1060'–1110'. As illustrated, the actual latency between servo burst 1020' and data sector 1060' is "x+x1", 1120', the actual latency between servo burst 1030' and data sector 1080' is "y+x2", 1121', the latency between servo burst 1040' and data sector 1090' is "x+x3", 1122', and the latency between servo burst 1050' and data sector 1100' is "y+x4", 1123'. In this case x1 and x2 are positive, and x3 and x4 are negative. Further the actual timing between servo bursts 1020' and 1030' is "t+t1", 1130', the time between servo bursts 1030' and 1040' is "t+t2", 1131', the time between servo bursts 1040' and 1050' is "t+t3", 1132', and the time between servo bursts 1050' and the next servo burst is "t+t4", 1133'. In this case t1 and t2 are positive and t3 and t4 are negative.

FIG. 9 illustrates the effect of drive eccentricity upon the timing of servo burst signals and data sector signals. As illustrated, the timing between servo bursts can increase from the nominal timing "t" 1130 to the actual timing "t+t1", 1130' or decrease to the actual timing "t+t3", 1132'. At the same time the latency between servo bursts to the next respective data sectors can increase from the nominal latency "x", 1120 to an actual latency "x+x1", 1120' or decrease to an actual latency "x+x3", 1122'.

FIG. 10 illustrates a typical "padding" solution for addressing drive eccentricity with reference to FIG. 9. Previously, if it were determined that the worse case (maximum) latency between a servo burst and the next data sector was "x+x1" 1120', this additional latency deviation "x1" was then added to nominal latencies for subsequent data sectors, regardless of the actual latency. For example "x+x1" would be applied as the latencies between servo bursts 1020', 1030', 1040', etc. and when the next data sector could be read.

In the example in FIG. 10, after servo burst 1020' the next data sector can be read after a "x+x1" latency is data sector 1060'. However, after servo burst 1030' the next data sector can be read after a "y+x1" latency; in this case data sector 1090', not 1080'. Further, after servo burst 1040' the next data sector that can be read after a "x+x1" latency is data sector 1100', not data sector 1090'.

In FIG. 8, data sector 1090 was referenced with respect to servo burst 1040; however, when the padding solution is used, in FIG. 10, data sector 1090' can only be referenced with respect to servo burst 1030'. As a result, if the MR head were currently at location 1140', in order to access data sector 1090', the magnetic disk would have to make more than one complete revolution before data sector 1090' could be accessed. This substantial delay is a drawback with this padding solution.

Thus, what is needed is a method and apparatus for allowing enhanced accessing of eccentric magnetic disks within removable cartridges.

SUMMARY OF THE INVENTION

According to the present invention, a techniques including methods and devices for providing improved performance of removable media are disclosed. In an exemplary embodiment, the present invention provides a methods and apparatus for predicting data sector latencies.

According to an embodiment, a method for transferring data from a magnetic disk within a removable cartridge includes the steps of inserting the magnetic disk formatted with a plurality of servo bursts and a plurality of data sectors into a removable drive unit, retrieving timing relationships between servo bursts within the plurality of servo bursts and next respective data sectors from the plurality of data sectors stored on the magnetic disk, and storing the timing relationships into a memory in the removable drive unit. The timing relationships in the memory are used to determine a latency between an occurrence of a servo burst from the plurality of servo bursts and an occurrence of a next respective data sector for the servo burst. The step of reading data stored in the next respective data sector is also performed Numerous benefits are achieved by way of the present invention. For instance, the present invention reduces the delay in accessing data from eccentric removable magnetic disks. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

System Overview

Figure 1:
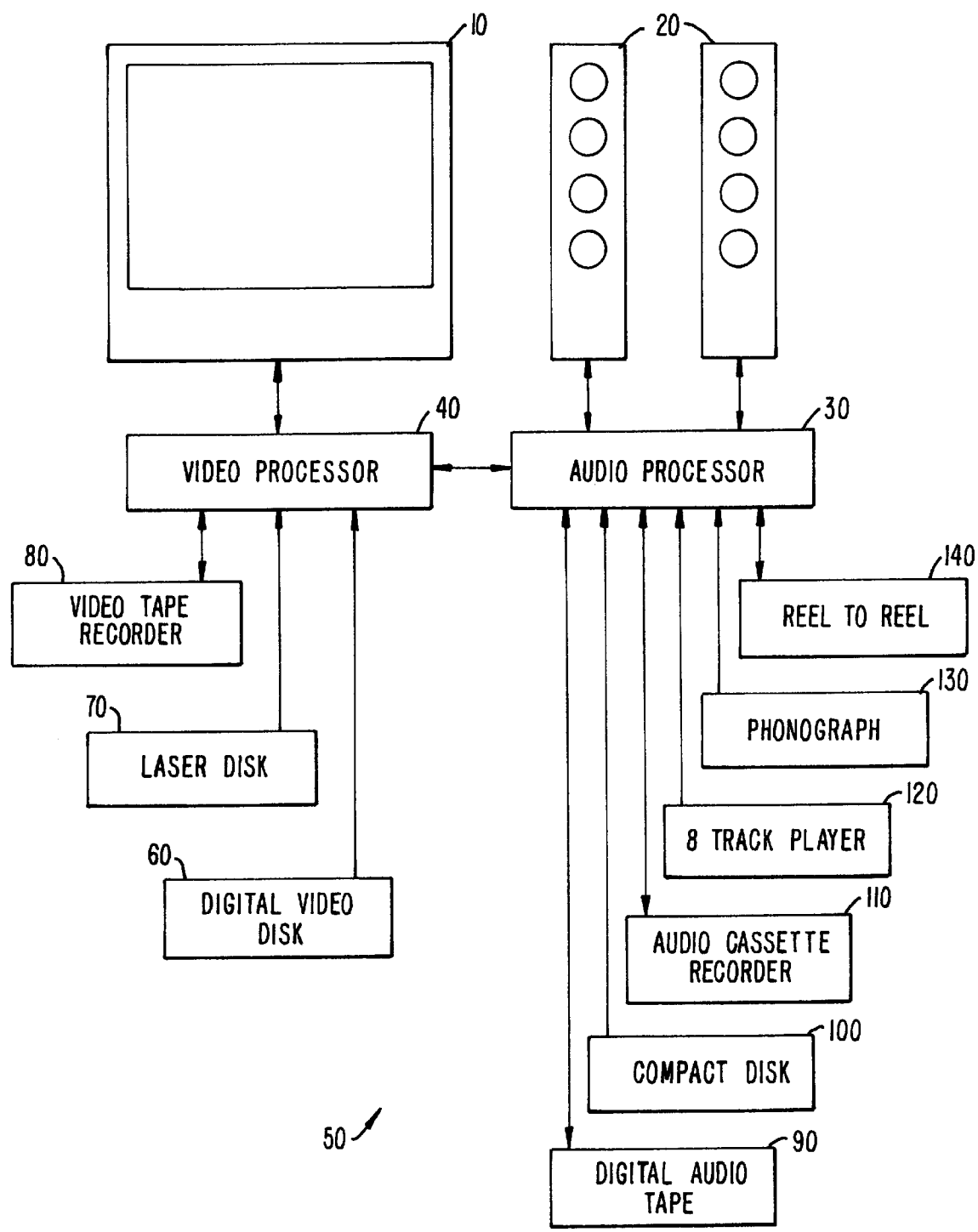
FIG. 1 illustrates a conventional audio and video configuration.
Figure 2:
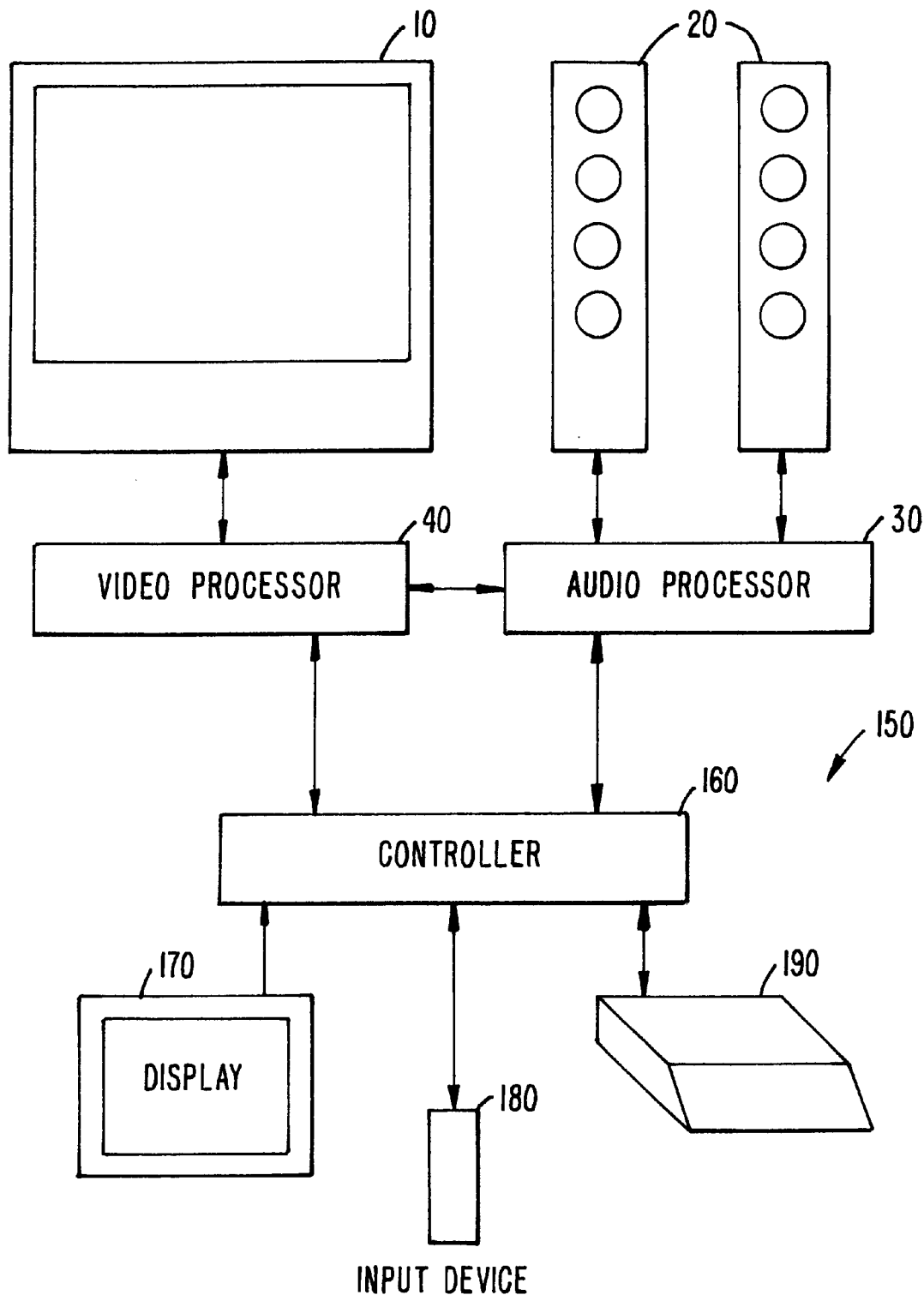
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
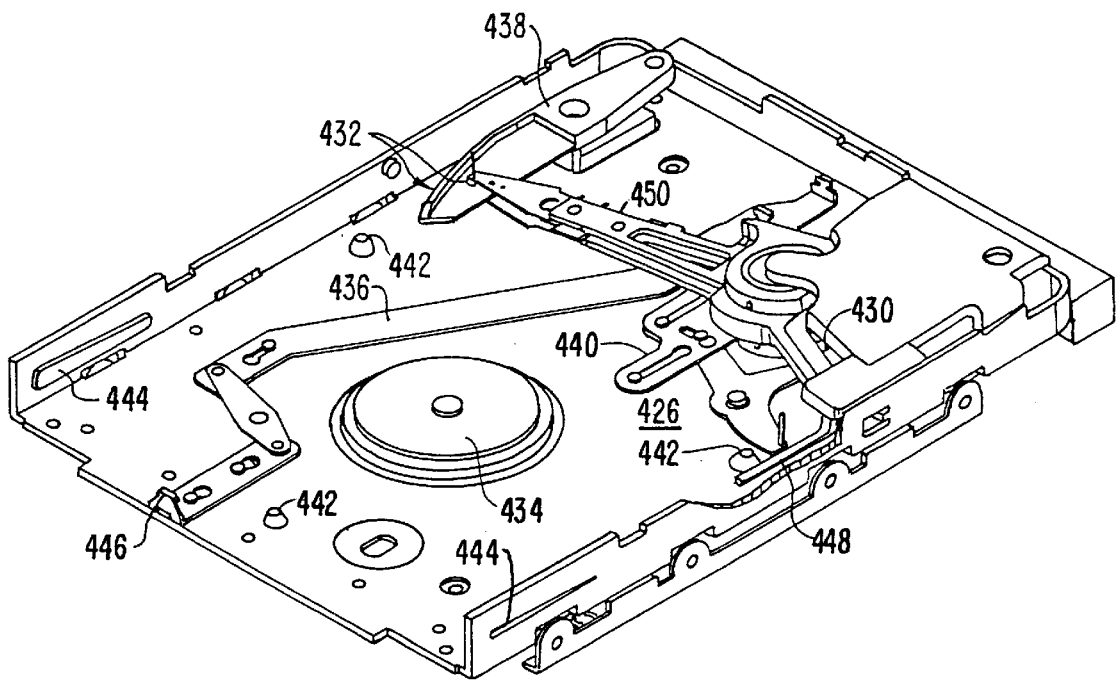
FIGS. 5A–5F illustrate simplified views and a storage unit for reading and/or writing from a removable media cartridge.
Figure 5B:
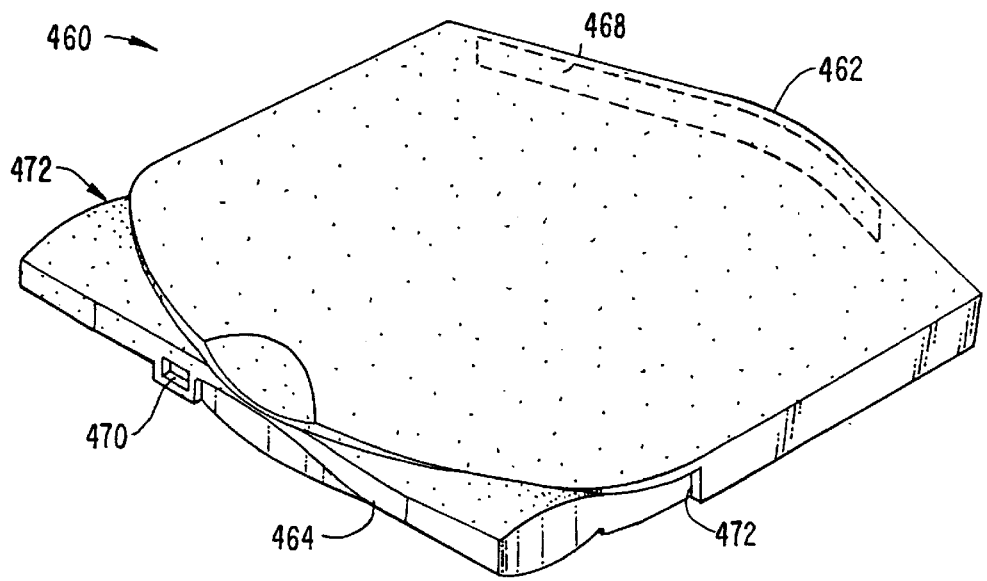
Figure 5C:
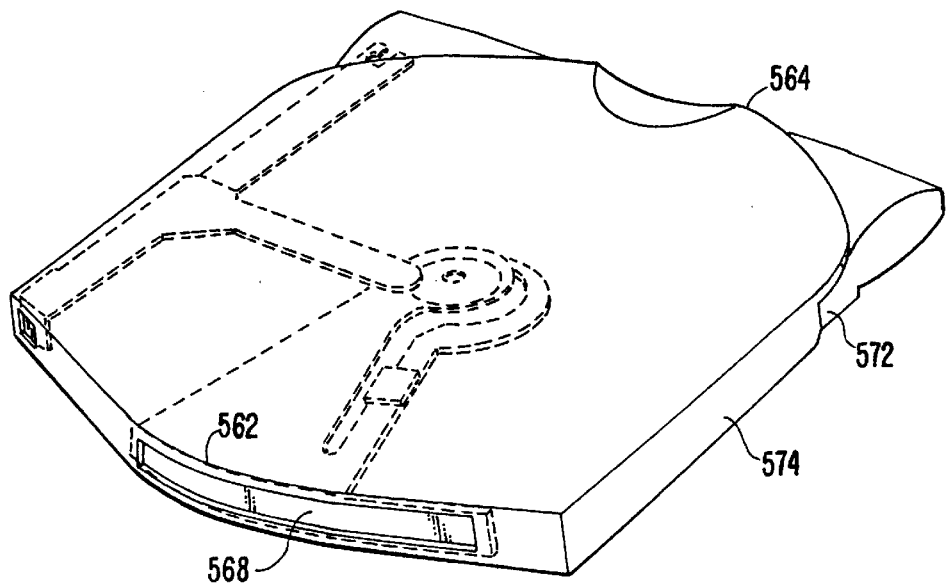

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII–2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
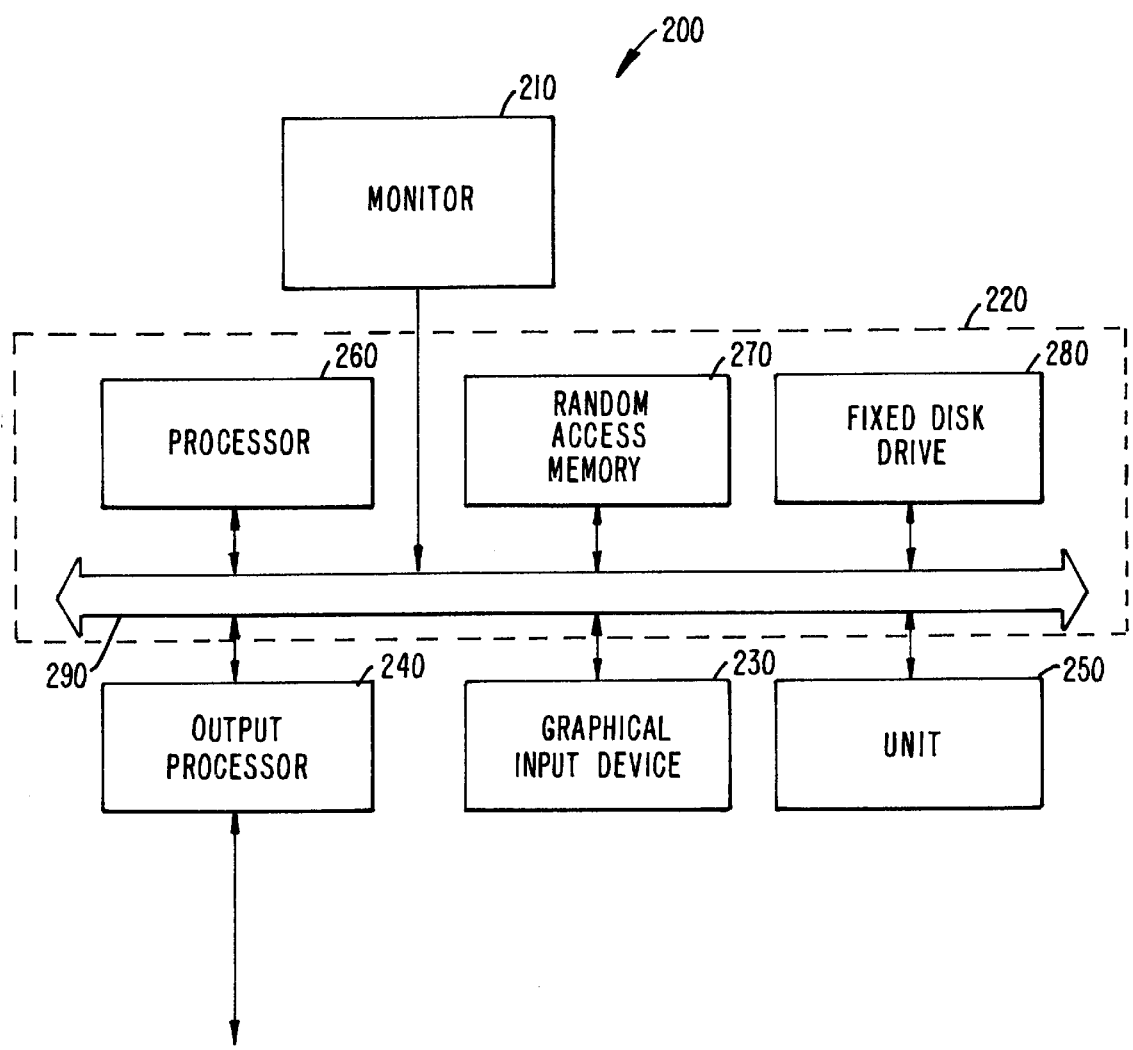
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows98™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
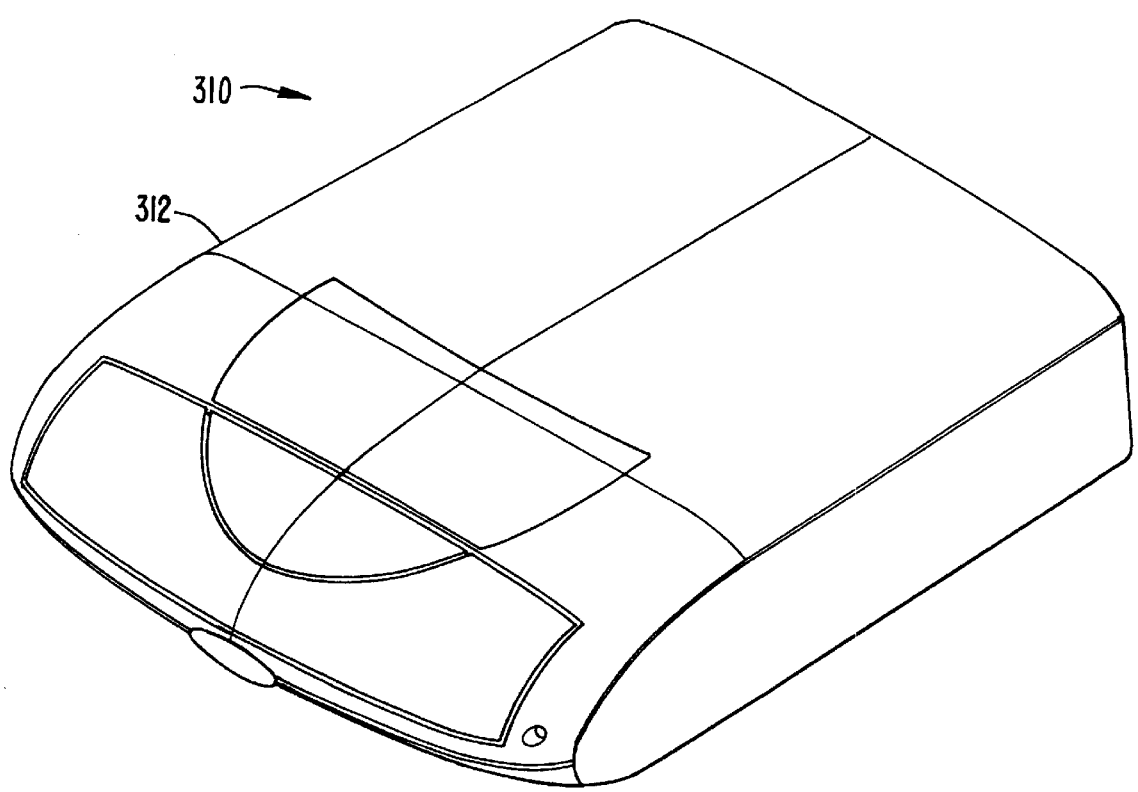
FIGS. 4A and 4B illustrate a storage unit according to an embodiment of the present invention.
Figure 4B:
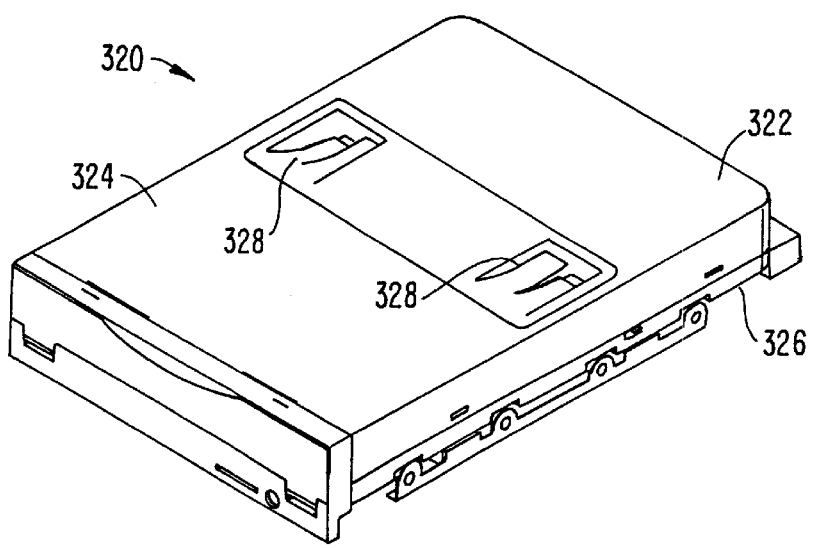

Referring now to FIGS. 4A and 4B, a storage unit according to the present invention can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
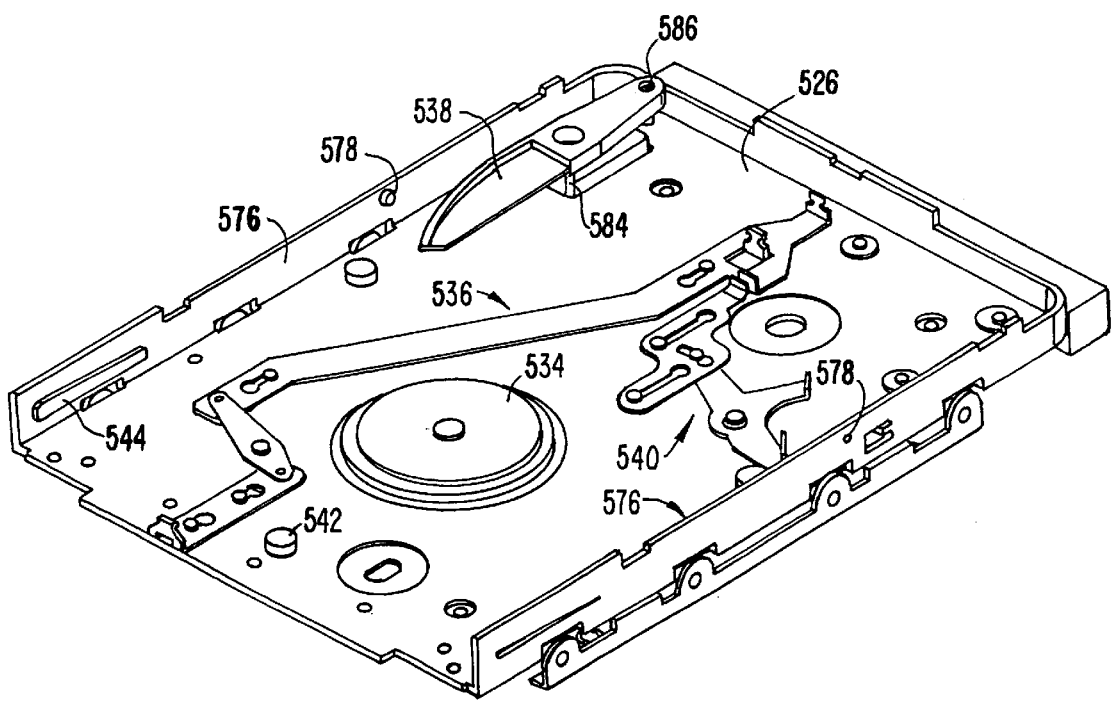
Figure 5E:
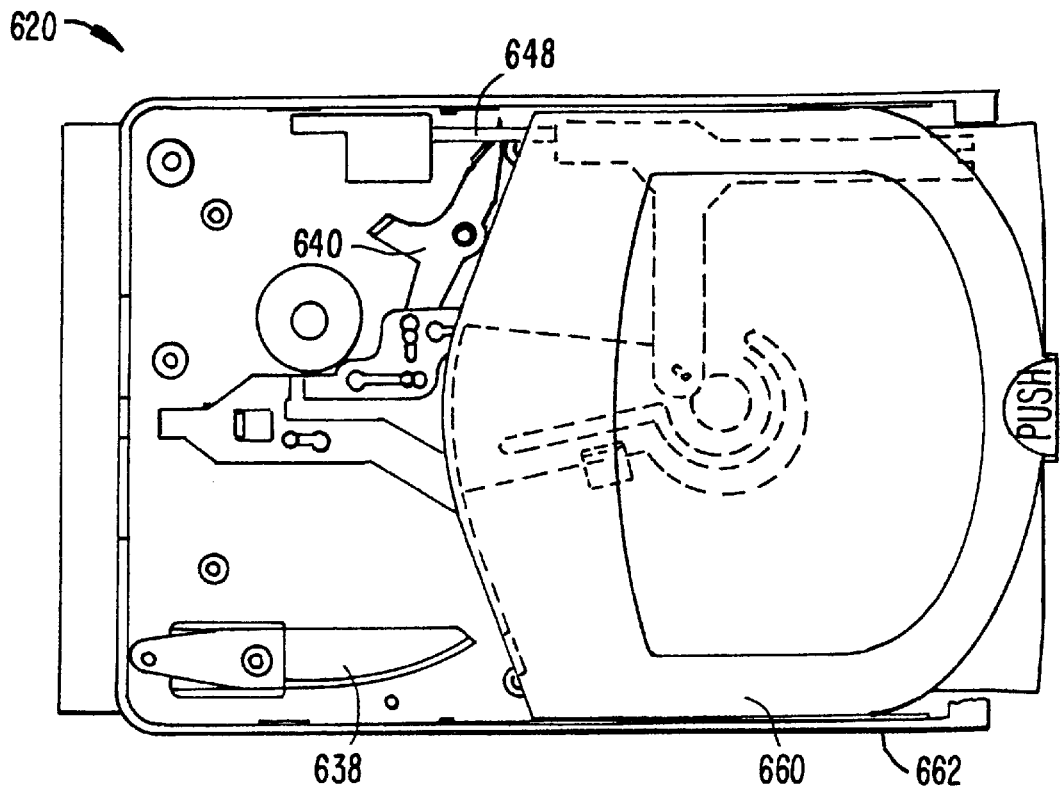

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
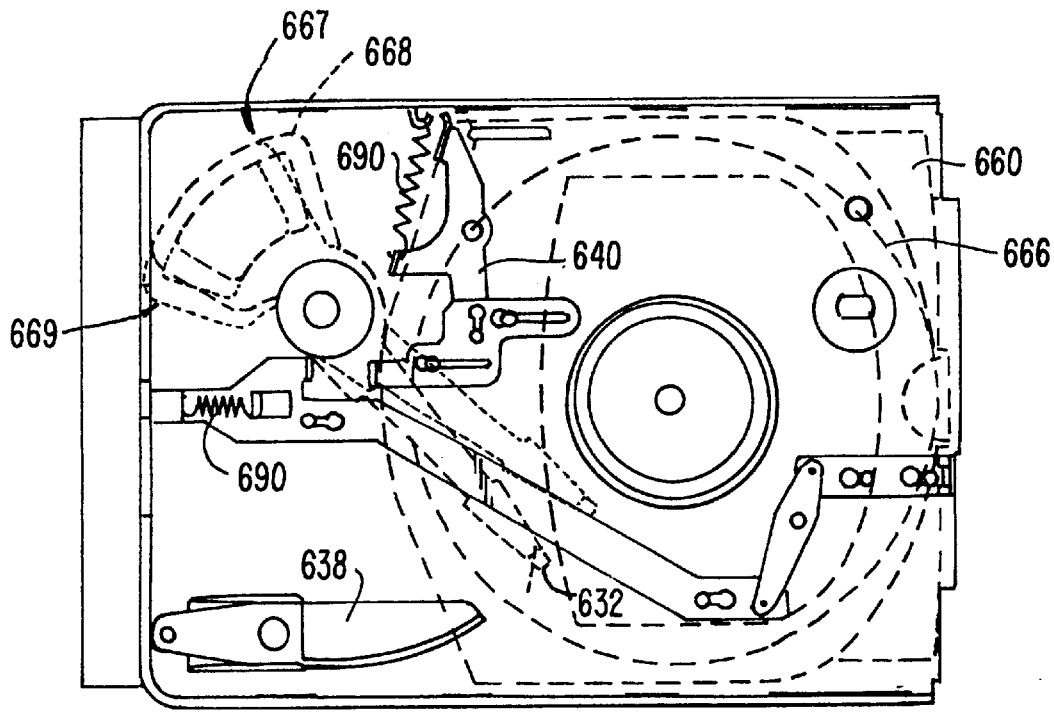

FIG. 5F also illustrates a typical first position 667 of VCM 668 and a typical second position 669 in response to different magnetic fluxes from a motor driver. As a result, read/write heads 632 are repositioned relative to disk 666 as shown.

Figure 6:
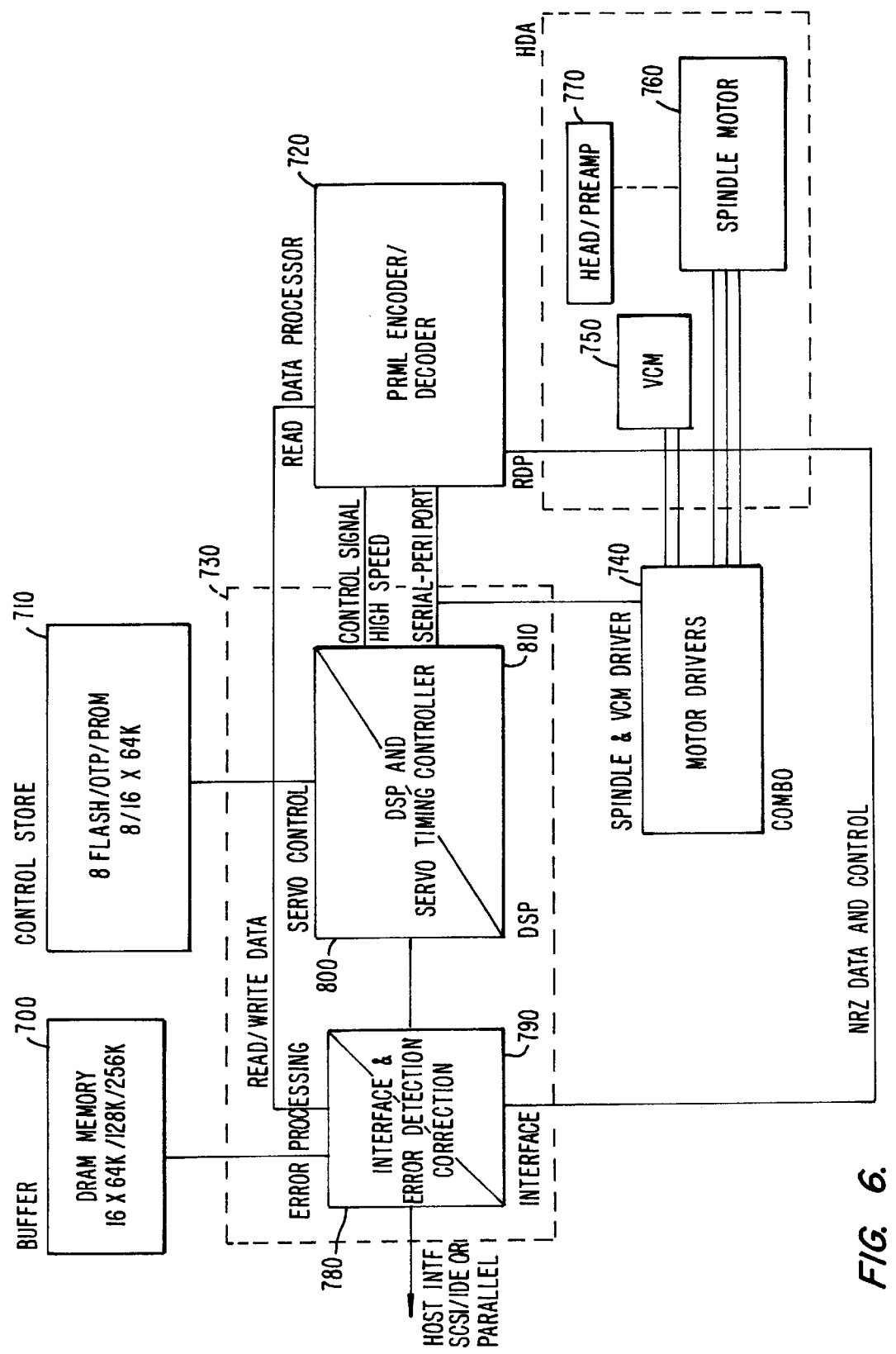
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64K, 128K, or 256K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises an 8 to 16 bit×64K memory array, preferably a flash RAM by Atmel. Control store 710 is coupled to DSP 800 and servo timing controller 810, and typically serves to store programs and other instructions for DSP 800 and servo timing controller 810. Preferably, control store 710 stores access information that enables retrial of the above information from the media and calibration data.

Read data processor 720 typically comprises a Partial Read/Maximum Likelihood (PRML) encoder/decoder. PRML read channel technology is well known, and read data processor 720 is typically embodied as an 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as an AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as an AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP800.

Motor driver 740 is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/write heads are typically positioned near the end of the actuator arm, as illustrated in FIG. 5A. The voice coil is typically electrically coupled to motor driver 740. VCM 750 is positioned relative to the magnetic disk in response to the amount of magnetic flux flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In a preferred embodiment of the present invention read/write heads are separate heads that utilize magneto resistive technology. In particular, the MR read/write heads. Typically a preamplifier circuit is coupled to the read/write heads.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/write heads are typically 0.001 millimeters above the magnetic disk. At 2000 rpm, the negative pressure on the read/write heads drops to approximately half the force as at 5400 rpm.

Figure 7:
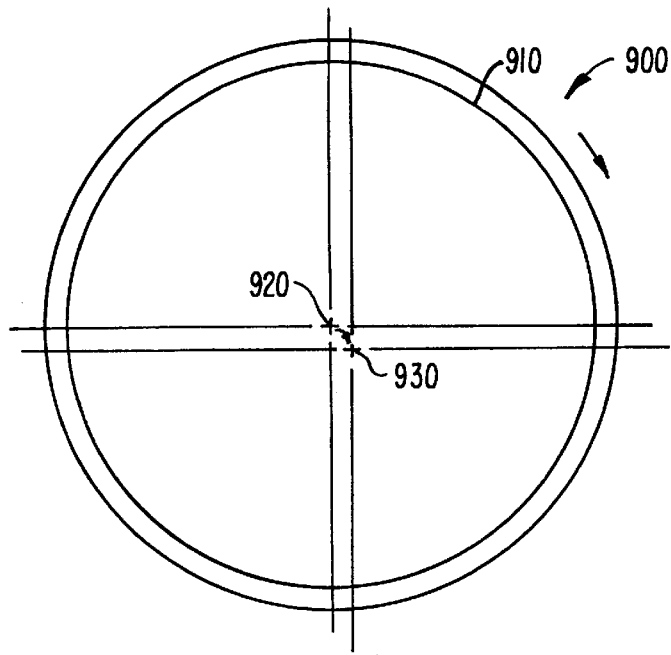
FIG. 7 illustrates one particular difficult problem not faced by fixed disk drive units.
Figure 8:
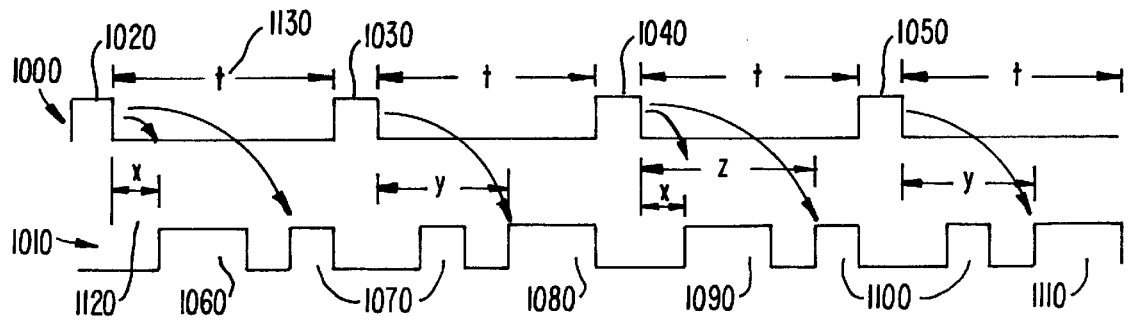
FIG. 8 illustrates an ideal timing diagram of signals from a magnetic disk.
Figure 9:
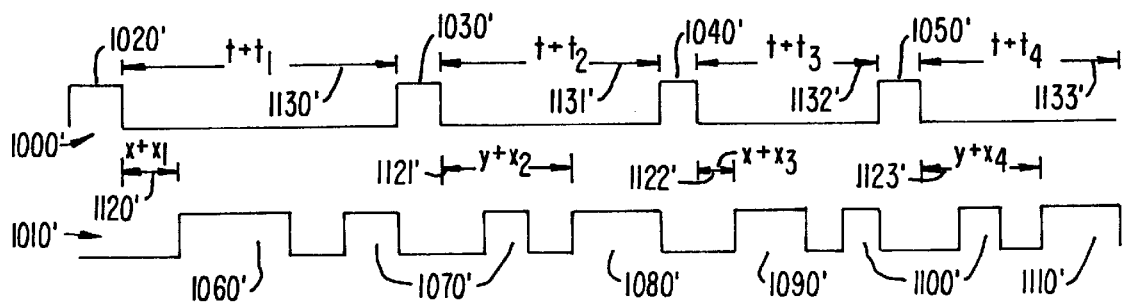
FIG. 9 illustrates a typical timing diagram of signals from an eccentric magnetic disk.
Figure 10:
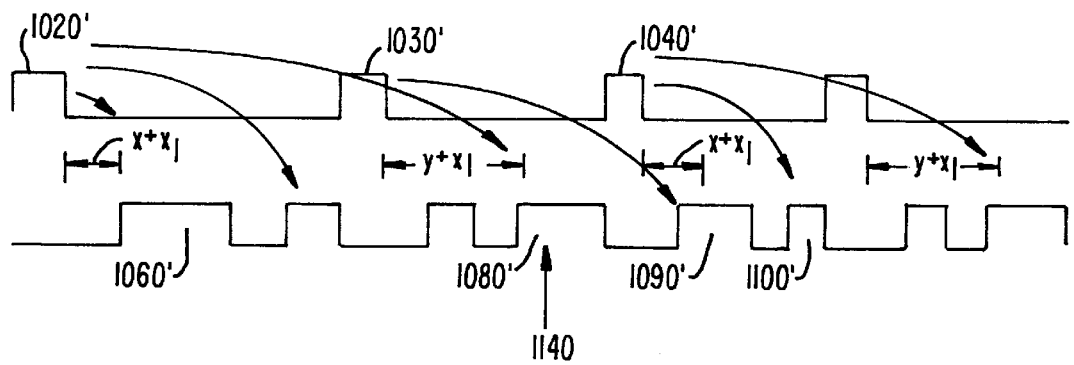
FIG. 10 illustrates a typical "padding" solution for addressing drive eccentricity.

FIG. 7 illustrates a functional block diagram of a circuit for unloading read/write heads from the magnetic disk and onto a loading/unloading ramp. FIG. 7 includes a more detailed block diagram of motor driver 740, above, including a dynamic braking/driver block 850, a retracting block 860, and a unloading block 870, each responsive to a power-on-reset (POR) signal. FIG. 7 also includes an energy storage capacitor 880. The solenoid 890 represents the voice coil described in conjunction with VCM 750, above.

In the embodiment in FIG. 7, dynamic braking/driver block 850 and retracting block 860 are embodied within the L6260L chip from SGS-Thomson.

Figure 11:
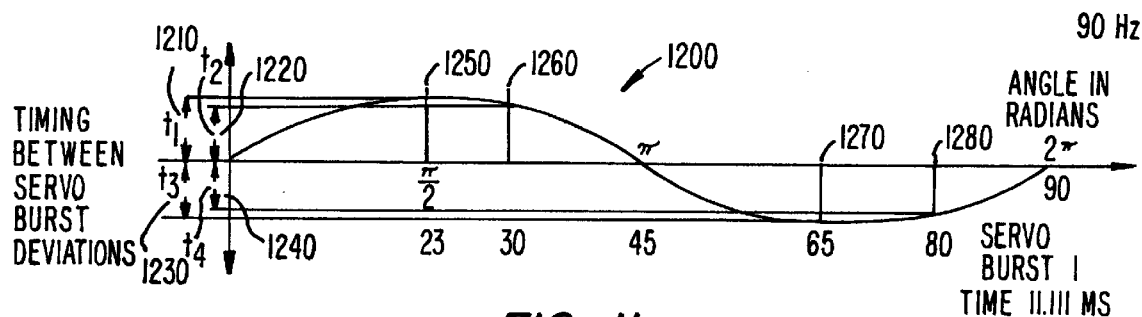
FIG. 11 illustrates a timing relationship according to an embodiment of the present invention.

FIG. 11 illustrates a timing relationship according to an embodiment of the present invention. FIG. 11 is a plot 1200 of timing deviations between servo sectors, identified by respective servo bursts relative to position along one cylinder of an eccentric magnetic disk. FIG. 11 includes multiple timing deviations 1210–1240 for positions 1250–1280, respectively. The horizontal axis is illustrated in terms of time, radians and servo sectors. In the present embodiment, there are 90 servo bursts per track, although in alternative embodiments, a greater or lesser number of servo bursts can be used. Further, the magnetic disk rotates at approximately 5600 rpm; thus the time for one revolution is approximately 11.111 ms (90 Hz).

As illustrated in FIG. 11, the deviation between servo bursts versus position on the track is typically sinusoidal. For example, for a servo burst located at position 1250, the actual timing between that servo burst and the next servo burst is approximately the nominal timing between servo bursts "t," plus timing deviation 1210, t1, i.e. t+t1. Further, by way of example, for a servo burst located at position 1270, the actual timing between that servo burst and the next servo burst is approximately the nominal timing between servo bursts "t," plus timing deviation 1230, t3, i.e. t+t3.

Initially, plot 1200 is determined by measuring the timing deviations for one cylinder. Once the magnitude (phase and amplitude) of plot 1200 is determined, timing deviations such as t4 can be determined based simply upon the servo burst number. For example, for servo burst 1280, 80 the predicted timing deviation is t4. This sinusoidal equation is preferably stored in control store 720. The derivation and implementation of such an equation can be performed by one of ordinary skill in the art.

Figure 12:
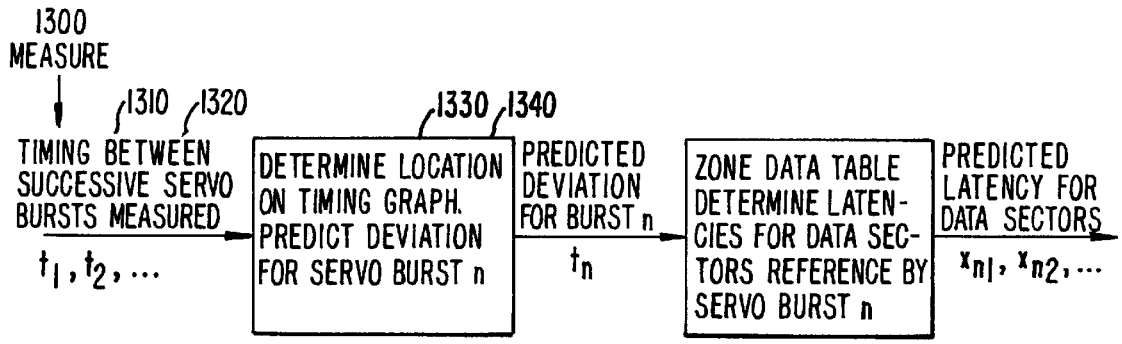
FIG. 12 illustrates a flow diagram for an embodiment of the present invention.

FIG. 12 illustrates a flow diagram for an embodiment of the present invention. In FIG. 12, using MR heads 770 the timing between three consecutive servo bursts A, B, and C is measured, step 1300. These timing measurements are then stored in buffer 700, step 1310. Next, since the nominal timing t between servo bursts A and B, and B and C is known, DSP 800 calculates the values for the timing deviations, tA and tB, step 1320.

Next, based upon the sinusoidal equation stored in control store 720, and the timing deviations tA and tB, DSP 800 then determines approximately where on plot (1200) MR head 770 is located, step 1330. Typical parameters determined for the equation include the phase of the sine wave and the amplitude of the sine wave. Based upon the phase, the amplitude, and the equation, DSP 800 then predicts the timing deviation tC for a following servo burst C, step 1340.

DSP 800 then preferably accesses a data zone table retrieved from the magnetic disk and stored within buffer 700, to determine the nominal latency between servo burst C, and data sectors referenced by servo burst C, step 1350. In the example in FIG. 7, the nominal latencies between servo burst 1040 and data sector 1090 and 1100 are x and z, respectively.

Based upon the nominal latencies and the timing deviation tC, the predicted latencies for data sectors referenced by servo burst C is determined, step 1360. This timing information is then passed to the read data processor 720 for timing the reading of data from MR head 770, step 1370.

Figure 13:
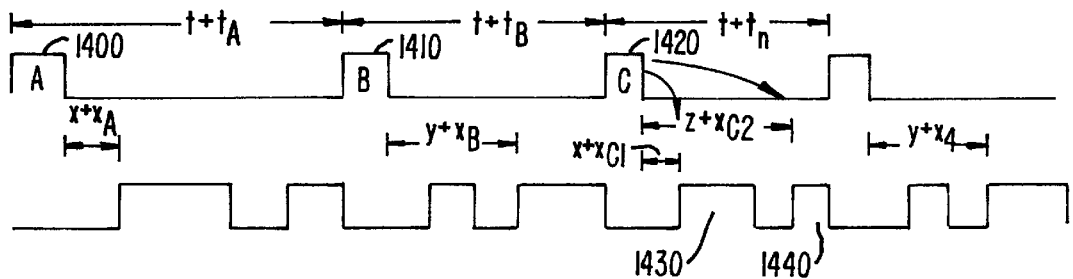
FIG. 13 illustrates an example of an embodiment of the present invention.

FIG. 13 illustrates an example of an embodiment of the present invention. FIG. 11 includes servo bursts A, B, and C, respectively 1400–1420. The timing between servo burst A 1400 and servo burst B 1410 is t+tA, and between servo burst B 1410 and servo burst C 1420 is t+tB. The nominal latency between servo burst C 1420 and data sector 1430 is x and between servo burst C 1420 and data sector 1440 is z.

As indicated above, initially servo bursts A, B, and C 1400–1420 are sensed and the timing between the servo bursts: t+tA and t+tB are ddtermined. Knowing the nominal timing t between the servo bursts, the timing deviations tA and tB are then determined.

Based upon the sinusoidal equation stored in the memory, the positions of servo bursts A and B on plot 1200, for example, can be determined. For example positions 1250 and 1260, respectively, in FIG. 11. Next, the predicted timing deviation tC for servo burst C 1420 is predicted.

From the data zone table, the nominal latency x between servo burst C 1420 and data sector 1430 and the nominal latency z between servo burst C 1420 and data sector 1440 are retrieved. Based upon the nominal latencies x and z, and the predicted timing deviation tC, the predicted latencies x+xC1 and Z+xC2 for data sectors 1430 and 1440 are determined. These predicted latencies are thus used for accessing data sectors 1430 and 1440.

In alternative embodiments of the present invention, the timing deviation of more than two servo bursts are used to enhance the determination of where upon the sinusoidal equation the MR head is located. For example, the timing deviation of three or more consecutive servo bursts can be used. Preferably, when the DSP processes more timing deviations, the DSP is able to predict the latencies, etc. with greater accuracy.

In other embodiments, predictions of latencies occur greater than one servo burst away from what was measured. For example, in response to the timing deviations from a first to a fourth servo sector, the predicted latencies for a thirtieth servo sector can be determined.

Preferably the embodiments of the present invention are operating during disk idle time so that the eccentricities are constantly monitored. In such embodiments, adjustment for predicted latencies is preferably performed, to account for the magnetic disk automatically re-centering itself, for sudden bumps or shifting of the removable drive unit, etc. In alternative embodiments, adjustment of predicted latencies occurs upon boot-up.

Other embodiments include algorithms that adjust the predicted timing deviations and predicted latencies for multiple cylinders. In an embodiment, if the servo sectors on adjacent cylinders are skewed, adjustment to the appropriate servo sectors is required depending upon the cylinder being accessed.

Conclusion

In the foregoing specification, the invention has been described with reference to specific exemplary embodiments thereof. Many changes or modifications are readily envisioned. For example, in the embodiments above, two data sectors were illustrated for each servo burst, however it should be understood that more than two data sectors are typically included for each servo burst in alternative embodiments.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for reading data from a magnetic disk, the method comprising:

inserting the magnetic disk into a disk drive, the magnetic disk including a cylinder having a plurality of servo bursts, a plurality of data sectors, and a zone data table, the plurality of servo bursts including a first servo burst, a second servo burst, and a third servo burst, the zone data table including at least a first nominal timing delay between the third servo burst and a first data sector;

detecting the first servo burst, the second servo burst, and the third servo burst from the magnetic disk;

determining a first time interval between detecting the first servo burst and detecting the second servo burst;

determining a second time interval between detecting the second servo burst and detecting the third servo burst;

determining a first time interval deviation in response to the first time interval;

determining a second time interval deviation in response to the second time interval;

predicting a third time interval deviation in response to the first time interval deviation and in response to the second time interval deviation;

determining a modified timing delay between the third servo burst and the first data sector in response to the predicted third time interval deviation; and waiting the modified timing delay after detecting the third servo burst before detecting the first data sector.

2. The method of claim 1 wherein determining the first time interval deviation comprises:

determining a nominal time interval between detecting the first servo burst and detecting the second servo burst; and subtracting the time interval between detecting the first servo burst and detecting the second servo burst from the nominal time interval between detecting the first servo burst and detecting the second servo burst.

3. The method of claim 1 further comprising:

using curve-fitting techniques to determine an equation for the plurality of time interval deviations in response to the first time interval deviation and the second time interval deviation;

wherein predicting the third time interval deviation comprises:

determining a phase for the equation; and predicting the third time interval deviation in response to the phase.

4. The method of claim 1 further comprising:

using curve-fitting techniques to determine an equation for the plurality of time interval deviations in response to the first time interval deviation and the second time interval deviation;

wherein predicting the third time interval deviation comprises:

determining an amplitude for the equation; and using the amplitude to predict the third time interval deviation.

5. The method of claim 1 further comprising reading the zone data table from the magnetic disk.

6. The method of claim 1 wherein detecting the first servo burst, the second servo burst, and the third servo burst comprises detecting the first servo burst, the second servo burst, and the third servo burst from the magnetic disk with a magneto-resistive read/write head.

7. The method of claim 1 further comprising before detecting the first servo burst rotating the magnetic disk to an operating speed with a spindle motor.

8. The method of claim 1 wherein the third time interval deviation is positive.

9. The method of claim 1 wherein the third time interval deviation is negative.

10. The method of claim 1 wherein the third time interval deviation is zero.

11. A computer system having a removable drive unit, the removable drive unit comprising:

a sensor configured to sense a first servo burst, a second servo burst, a third servo burst, and a data sector;

a processor coupled to the sensor configured to determine a plurality of time periods between adjacent servo bursts, including a first time period between the first servo burst and the second servo burst and including a second time period between the second servo burst and the third servo burst, and a memory coupled to the processor configured to store the first time period, the second time period, and an equation modeling the plurality of time periods;

wherein the processor is also configured to determine a phase for the equation in response to the plurality of time periods, configured to predict a third time period between a third servo burst and a fourth servo burst in response to the phase and the equation, and configured to delay sensing of the data sector after sensing the third servo burst in response to the predicted third time period; and wherein the memory is also configured to store the phase.

12. The computer system of claim 11 wherein the processor is also configured to determine a first timing deviation between the first servo burst and the second servo burst, configured to determine a second timing deviation between the second servo burst and the third servo burst, and configured to determine a phase for the equation in response to the plurality of time periods.

13. The computer system of claim 11 wherein the processor is also configured to determine an amplitude for the equation in response to the plurality of time periods.

14. The computer system of claim 11 wherein the removable drive unit also includes:

a spindle motor coupled to the processor, the spindle motor configured to rotate a magnetic disk at an operating speed.

15. The computer system of claim 14 wherein the sensor senses the first servo burst after the magnetic disk reaches the operating speed.

16. The computer system of claim 11 wherein the sensor comprises a magneto-resistive read/write head.

17. The computing system of claim 11 wherein the predicted third time period is less than a nominal time period between the third servo burst and the fourth servo burst.

18. The computing system of claim 11 wherein the predicted third time period is greater than a nominal time period between the third servo burst and the fourth servo burst.

19. The computing system of claim 11 wherein the predicted third time period is equal to a nominal time period between the third servo burst and the fourth servo burst.

* * * * *